Patented Sept. 28, 1937

2,094,439

UNITED STATES PATENT OFFICE 2,094,439

CERAMIC RAW MATERIAL AND METHOD OF MAKING SAME

Joseph H. Weis, West Paris, Maine, assignor to Feldspathic Research Corporation, New York, N. Y., a corporation of Delaware No Drawing. Application May 22, 1936, Serial No. 81,189

3 Claims. (Cl. 106—10)

This invention relates to the art of ceramics and has for its principal object the provision of a ceramic raw material for ceramic ware, which is made from domestic kaolins and has the properties of English china clays.

A further object is to provide a domestic product which can be used as a substitute for English china clays without substantial changes in the process of utilization.

A still further object is to increase the usefulness of certain domestic kaolins.

China clays or kaolins are necessary ingredients in white ware body mixtures. The English clays which are used in this country for this purpose are commonly known as china clays, while the white clays in this country are generally referred to as kaolins. The English clays are preferred by most potters because they produce ware with a high fired strength, and the ware, furthermore, is more vitrified and has lower porosity as compared to ware made with domestic kaolins. The use of English china clays by American potters has been practiced since the start of the pottery industry in this country, although large amounts of domestic kaolins were available to them. However, because of the poor results obtained in white ware body mixtures with domestic kaolin, manufacturers of vitrified ware especially have turned to the use of the imported clays, and as a result the domestic producers have lost large potential markets for their materials.

The present invention makes possible the utilization of those large deposits of domestic kaolins which heretofore were considered unsuitable and undesirable for use in vitrified ceramic ware, such as dinner ware and sanitary ware.

This ceramic raw material can be substituted directly for English china clays without making any adjustment in the batch, and the resulting product has all of the desirable properties which were formerly obtained by the imported clays.

In order to better understand this invention, reference is made to Table 1 and Table 2, showing tests made on five typical English china clays and nine domestic china clays of the type heretofore known, the data representing extremes. In these and subsequent tests, unless otherwise indicated, the data was obtained on ware fired to cone 10 plus.

Table 1.—Domestic china clays

|  | Percent water of plasticity | Dry shrinkage, per cent | Total shrinkage, per cent | Fired shrinkage, per cent | Dry mod. of rupt., #s/sq. in. | Absorption, per cent |
|---|---|---|---|---|---|---|
| Min | 36.3 | 2.8 | 8.7 | 4.6 | 15 | 10.3 |
| Max | 50.8 | 7.8 | 18.3 | 13.2 | 430 | 25.6 |

Table 2.—English china clays

|  | Percent water of plasticity | Dry shrinkage, per cent | Total shrinkage, per cent | Fired shrinkage, per cent | Dry mod. of rupt., #s/sq. in. | Absorption, per cent |
|---|---|---|---|---|---|---|
| Min | 38.7 | 2.7 | 12.2 | 8.1 | 41 | 9.6 |
| Max | 43.3 | 6.4 | 16.7 | 10.3 | 207 | 14.8 |

From the foregoing data, it is apparent that the essential differences between domestic and English china clays are the higher strength in the dry state, the higher absorptions, and the higher drying shrinkage of domestic clays. These clays also have less average total and firing shrinkage as compared to the English materials.

These differences are also shown in Tables 4 and 5 where domestic and English china clays were incorporated in a body of the following composition:

Table 3

| | Per cent |
|---|---|
| North Carolina feldspar | 15 |
| Flint | 35 |
| Kentucky ball clay | 15 |
| Clay being studied | 35 |

Table 4.—Bodies containing domestic clays

|  | Percent water of plasticity | Dry shrinkage, per cent | Total shrinkage, per cent | Fired shrinkage, per cent | Fired mod. of rupt., #s/sq. in. | Absorption, per cent |
|---|---|---|---|---|---|---|
| Min | 23.2 | 3.3 | 9.5 | 5.8 | 5015 | 5.35 |
| Max | 29.4 | 6.4 | 12.3 | 7.2 | 6806 | 9.57 |

Table 5.—Bodies containing English clays

|  |  |  |  |  |  |  |
|---|---|---|---|---|---|---|
| Min | 24.3 | 4.2 | 11.8 | 7.3 | 6278 | 1.51 |
| Max | 28.5 | 5.6 | 13.7 | 8.6 | 7200 | 4.05 |

From these tests it is obvious that ware containing English clays have less absorption and are stronger than the similar bodies containing domestic clays.

According to my invention, I have so changed the characteristics of the domestic clays as to make them suitable for direct replacement of the English clays. I have discovered that when a feldspathic flux is added to domestic kaolins and thoroughly mixed with these kaolins in proper proportions, the resultant product can be used in place of the English clays. In other words, my modified American kaolins can be used to replace the imported English china clays without any impairment in the quality of the finished ware, and without the need for the user to make any changes in his manufacturing processes to adopt the American material.

In order to carry out this invention, I have added a feldspathic flux to one or more domestic kaolins. Water is added to the clays which are thoroughly blunged, the feldspathic flux is added to the blunged material and this flux is thoroughly mixed in the blunger with the clay to insure a homogeneous mass. This mixture is passed through a filter press and the excess water removed. For continuous operation, a vacuum filter is preferred for this purpose. Further drying can be carried out on the mixture if the consumer demands a drier product. This product is now in a form where it is a direct substitute for the imported china clays, and can be used in a white wares batch to produce vitrified or semi-vitrified ware without any change in the method of manufacturing employed by the user.

White ware bodies in general can be represented by the mix shown in Table 3. In my prepared domestic clay, I have used, in place of the 35% English china clay which is indicated in the mix, from 3.5% to 10.5% feldspathic fluxes and from 24.5% to 31.5% of kaolin. The resulting composition is as follows:

Table 6

| | Per cent |
|---|---|
| North Carolina feldspar | 15 |
| Flint | 35 |
| Kentucky ball clay | 15 |
| Feldspathic fluxes | 3.5 to 10.5 |
| Kaolin | 24.5 to 31.5 |

It will be noted that the amount of feldspathic fluxes is about 10% to 30% of the amount of kaolin. The proportion of feldspathic fluxes and kaolin are selected to produce a mixture of about the following composition:

| | Per cent |
|---|---|
| Silica | 47–57 |
| Alumina | 27–37 |
| Potash | 0.2–4.0 |
| Soda | 0.2–3.0 |
| $Fe_2O_3$, CaO, MgO, etc. less than | 3 |

This mixture is used as a substitute for English china clay.

The similarity of my new ceramic raw material to the imported English china clays, is shown by Tables 7 and 8 which show the minimum and maximum test data obtained with my new raw material as compared to the same type of test data on bodies containing English clays.

Table 7.—*Properties of bodies containing new ceramic raw material*

| | Percent water of plasticity | Dry shrinkage, per cent | Total shrinkage, per cent | Fired shrinkage, per cent | Fired mod. of rupt., #s/sq. in. | Absorption, per cent |
|---|---|---|---|---|---|---|
| Min | 24.2 | 4.4 | 11.1 | 5.8 | 6500 | 2.3 |
| Max | 26.2 | 5.5 | 12.7 | 8.1 | 7175 | 6.5 |

Table 8.—*Properties of bodies containing English clay*

| | | | | | | |
|---|---|---|---|---|---|---|
| Min | 24.9 | 4.2 | 12.2 | 7.5 | 6625 | 2.9 |
| Max | 27.4 | 5.6 | 13.4 | 8.1 | 7325 | 4.2 |

It will be noted that there is a close similarity of physical properties of ware containing my new raw material as compared to ware containing imported china clays.

Under regular factory conditions of the user, I have, furthermore, successfully replaced the English china clays without any change being made in their manufacturing processes, and the comparative data are indicated below in Table 9.

Table 9

| Body | Water of plasticity | Dry mod. of rupt. | Dry shr. | Total shr. | Firing shr. | Fired mod. of rupt. | Absorption |
|---|---|---|---|---|---|---|---|
| English | 24.3 | 435 | 5¼ | 12¾ | 7½ | 8800 | 0.2 |
| Domestic | 23.7 | 430 | 5½ | 12¾ | 7¼ | 9000 | 0.2 |

From the above, it is very apparent that my new ceramic raw material is the equivalent in every way to the imported English china clay, and all of the desirable properties imparted to the ware by the use of the imported material is also obtained by the use of my new ceramic raw material.

These tests and data also indicate that the utilization of domestic kaolin as a substitute and replacement for the imported English products have opened up new and larger markets for domestic kaolins which heretofore were not used for such purposes. The use of these domestic kaolins by manufacturers of ceramic ware results in lower costs by eliminating the need of importing high cost materials. The user is also assured of consistent and easily obtained supplies of domestic kaolins, where formerly the imported material required large inventories and advance purchases, because of the difficulty experienced in ordering such foreign materials which required shipment by boat and train.

The invention claimed is:

1. A ceramic raw material for use as a substitute for English china clay in the manufacture of white wares, consisting of a mixture of domestic kaolin and feldspathic flux, said mixture having about the following composition: silica 47–57%, alumina 27–37%, potash 0.2–4.0%, soda 0.2–3.0%.

2. A ceramic raw material for use as a substitute for English china clay in the manufacture of white wares, consisting of a mixture of domestic kaolin and feldspathic flux, said mixture having about the following composition: silica 47–57%, alumina 27–37%, potash 0.2–4.0%, soda 0.2–3.0%, $Fe_2O_3$, CaO and MgO less than 3%.

3. The method of making a ceramic raw material for use as a substitute for English china clay in the manufacture of white wares which consists of mixing domestic kaolin with feldspathic flux in such proportions as to produce a silica content of 47–57%, an alumina content of 27–37%, a potash content of 0.2–4.0% and a soda content of 0.2–3.0%, blunging the mixture and filtering to remove excess water.

JOSEPH H. WEIS.